US008649682B2

(12) United States Patent
Presi et al.

(10) Patent No.: US 8,649,682 B2
(45) Date of Patent: Feb. 11, 2014

(54) PASSIVE OPTICAL NETWORK

(75) Inventors: Marco Presi, Pisa (IT); Fabio Cavaliere, Vecchiano (IT); Ernesto Ciaramella, Rome (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 40 days.

(21) Appl. No.: 13/496,868

(22) PCT Filed: Sep. 18, 2009

(86) PCT No.: PCT/EP2009/062141
§ 371 (c)(1),
(2), (4) Date: May 30, 2012

(87) PCT Pub. No.: WO2011/032597
PCT Pub. Date: Mar. 24, 2011

(65) Prior Publication Data
US 2012/0237220 A1    Sep. 20, 2012

(51) Int. Cl.
*H04J 14/00* (2006.01)
(52) U.S. Cl.
USPC .......... 398/72; 398/68; 398/67; 398/70; 398/71; 398/100; 398/79; 398/87; 398/174; 398/175; 398/176; 370/352; 370/392; 370/389; 370/468; 370/395.4; 370/442; 370/503; 370/465
(58) Field of Classification Search
USPC .......... 398/66, 67, 68, 69, 70, 71, 72, 98, 99, 398/100, 58, 79, 87, 158, 159, 174, 175, 398/176, 180; 370/352, 392, 389, 468, 503, 370/465, 395.31, 395.4, 442, 476
See application file for complete search history.

(56) References Cited

U.S. PATENT DOCUMENTS 8,369,706 B2 * 2/2013 Sorin ........................ 398/72
8,494,366 B2 * 7/2013 Kim ........................... 398/72

OTHER PUBLICATIONS

Han-Hyuan Lin et al., "WDM-PON Systems Using Cross-Remodulation to Double Network Capacity with Reduced Rayleigh Scattering Effects," Feb. 24, 2008, 3 pages, Optical Fiber Communication/National Fiber Optic Engineers Conference.
International Search Report, Application No. PCT/EP2009/062141, dated Jun. 23, 2010, 1 page.

(Continued)

*Primary Examiner* — Hanh Phan
(74) *Attorney, Agent, or Firm* — Blakely Sokoloff Taylor & Zafman, LLP

(57) ABSTRACT

A distribution node of a passive optical network (PON) comprises a first port for receiving a first optical continuous envelope modulated downstream data signal at a first wavelength ($\lambda_C$) from a first optical line termination unit (OLT1) and a second port for receiving a second optical continuous envelope modulated downstream data signal at a second wavelength ($\lambda_L$) from a second optical line termination unit (OLT2). A first converter (FBG-1) performs continuous envelope modulation-to-intensity modulation conversion of the first optical downstream data signal and forwards the converted first optical downstream data signal ($\lambda_C$) to the first group of optical network units ($ONU_{1...N}$). A second converter (FBG-2) performs continuous envelope modulation-to-intensity modulation conversion of the second optical downstream data signal and forwards the converted second optical downstream data signal ($\lambda_L$) to the second group of optical network units ($ONU_{N+1...2N}$). The distribution node forwards a seed signal at the first wavelength ($\lambda_C$) to the second group of optical network units ($ONU_{N+1...2N}$) and forwards a seed signal at the second wavelength ($\lambda_L$) to the first group of optical network units ($ONU_{1...N}$).

20 Claims, 4 Drawing Sheets

(56) References Cited

OTHER PUBLICATIONS

Xu, Zhaowen, et al., "High-speed WDM-PON using CW injection-locked Fabry-Perot laser diodes", Mar. 19, 2007, pp. 2953-2962, vol. 15, No. 6, Optics Express.

* cited by examiner

PASSIVE OPTICAL NETWORK

CROSS-REFEENCE TO RELATED APPLICATIONS

This application is a National stage of International Application No. PCT/EP2009/062141, filed Sep. 18, 2009, which is hereby incorporated by reference.

TECHNICAL FIELD

This invention relates to passive optical networks (PON).

BACKGROUND

A Passive Optical Network (PON) is a technology for the access network of a communications system. A PON typically has a central office called an Optical Line Termination (OLT) which interfaces with a metro or carrier network and an arrangement of optical fibres and splitters which connect the OLT with multiple Optical Network Units (ONU) or Optical Network Termination (ONT) units. In a Fibre To The Home (FTTH) system an ONU is located at a subscriber premises while in a Fibre To The Curb (FTTC) system an ONU is located at a roadside cabinet.

More recently, Wavelength Division Multiplexed Passive Optical Networks (WDM PON) have been proposed. A WDM PON supports multiple wavelength channels. A separate wavelength can be allocated for communication between the Optical Network Unit (OLT) and each ONU in the PON. The potential advantages of using WDM techniques in fibre access networks include increased capacity, service agnostic end-to-end connectivity, bit rate transparency, easy channel upgrade, long distance reach, simplified network operation and maintenance.

There are three main classes of WDM PON architectures: (i) a WDM PON based on tunable lasers at the ONU; (ii) a WDM PON based on a remotely seeded ONU; and (iii) a WDM PON based on downstream remodulation.

In the first class of system, the optical carrier that is used for upstream communication (ONU to OLT) is locally generated at the ONU, using a tunable laser. The use of tunable lasers allows the longest link distance (reach) due to a simple system architecture, low optical path loss and absence of reflections induced penalties. Drawbacks are the cost of providing a laser at each ONU, the reduced capacity (two different wavelengths are needed for the upstream and downstream channels) and the need of a handshake protocol between OLT and ONU for the automated adjustment of the upstream optical carrier frequency.

In the second class of system, the optical carriers are remotely generated, typically at the OLT, and then distributed to the ONUs, where a device such as a Reflective Semiconductor Optical Amplifier (RSOA), Reflective Electro-absorption Modulator (REAM) or injection locked Fabry-Pérot Laser Diode (FPLD) can be used to modulate the upstream signal. The advantage of the second class of systems is the lower cost of a RSOA, REAM or FPLD compared to that of a tunable laser. However, the achievable distance is shorter because the upstream optical carrier experiences twice the link attenuation and the reflections at the connectors or within the fibre (Rayleigh backscattering) couple unmodulated and modulated signal travelling into opposite direction along the same fibre, giving rise to a cross-talk penalty. This class of system is shown in the paper "High-speed WDM-PON using CW injection-locked Fabry-Pérot laser diodes", Xu et al, Optics Express Vol. 15, No. 6, March 2007, pp. 2953-2962.

In the third class of system, the downstream signal is a continuous envelope modulated signal which is tapped before the ONU receiver and remodulated by the upstream signal. The third class of system experiences the same issues, with the additional drawback that the remodulating device used at the ONU (e.g. a RSOA) is non-ideal and can cause further interference on the upstream signal, due to residual downstream modulation. A known method is to use a constant envelope modulation format in downstream (FSK, DPSK, etc.) so that no amplitude fluctuations affect the amplitude modulation used instead for the upstream. In such a kind of system, means for phase modulation-to-amplitude modulation conversion are needed at the ONU in order to correctly receive the downstream signal because a photodiode is sensitive only to amplitude variations and not to phase variations. The main advantage compared to the other two classes is the doubled capacity, because exactly the same wavelength is used in downstream and upstream. This class of system is shown in the paper "An Optical Network Unit for WDM Access Networks with Downstream DPSK and Upstream Remodulated OOK Data using Injection-locked FP Laser", Hung et al, IEEE Photonics Technology Letters, Vol. 15, No. 10, October 2003.

H-H. Lin et al., "WDM-PON Systems Using Cross-Remodulation to Double Network Capacity with Reduced Rayleigh Scattering Effects", OFC 2008, paper OTuH6 describes a cross-PON concept. A first OLT transmits a downstream signal which is used to transmit data to a first group of ONUs and also serves as a seed signal for a second group of ONUs. A second OLT transmits a downstream signal which is used to transmit data to the second group of ONUs and also serves as a seed signal for the first group of ONUs. Demodulation of the downstream signal is performed individually at each ONU.

SUMMARY

A first aspect of the present invention provides a distribution node for a passive optical network (PON) comprising: a first port for receiving a first optical continuous envelope modulated downstream data signal at a first wavelength from a first optical line termination unit; a second port for receiving a second optical continuous envelope modulated downstream data signal at a second wavelength from a second optical line termination unit; a third port for connecting to a first group of optical network units; a fourth port for connecting to a second group of optical network units; a first converter which is arranged to perform continuous envelope modulation-to-intensity modulation conversion of the first optical downstream data signal and to forward the converted first optical downstream data signal to the first group of optical network units; a second converter which is arranged to perform continuous envelope modulation-to-intensity modulation conversion of the second optical downstream data signal and to forward the converted second optical downstream data signal to the second group of optical network units; wherein the distribution node is further arranged to forward a seed signal at the first wavelength to the second group of optical network units and forward a seed signal at the second wavelength to the first group of optical network units, the seed signal being for use in forming an upstream modulated signal at an optical network unit.

The PON has a high capacity while also incurring a low penalty due to reflections, as different wavelengths are used for the upstream and downstream directions. The apparatus required at each ONU is low cost and "colourless", meaning that the apparatus is not specific to a particular wavelength. Performing conversion between continuous envelope modulation and intensity modulation at the distribution node avoids the need to individually perform such conversion at each ONU and thereby offers a reduction in the complexity and cost for the apparatus required at each ONU. The channel density (i.e. number of modulated channels/number of optical fibers) on the two fibres between a central office and the distribution node is the same as a single fibre system. All of the available wavelengths can be fully exploited for upstream or downstream transmission on one of the two fibres.

Advantageously, the PON is a wavelength division multiplexed PON (WDM-PON) in which there is a plurality of the first continuous envelope modulated optical downstream data signals each at a respective first wavelength ($\lambda_C$) and a plurality of the second continuous envelope modulated optical downstream data signals each at a respective second wavelength ($\lambda_L$). The plurality of first data signals and second data signals can occupy different wavelength bands (e.g. the C-band and L-band), different portions of one of these bands (e.g. the "red" and "blue" portions of the C-band) or any other scheme which allocates different wavelengths to the signals.

The term "continuous envelope modulated data signal" is intended to encompass phase modulation (e.g. Differential Phase Shift Keying DPSK), frequency modulation (e.g. Frequency Shift Keying) and any other modulation scheme which gives a continuous, or quasi-continuous, envelope to the modulated signal in the presence of changing data.

BRIEF DESCRIPTION OF THE DRAWINGS

Embodiments of the invention will be described, by way of example only, with reference to the accompanying drawings in which.

DETAILED DESCRIPTION

Figure 1:
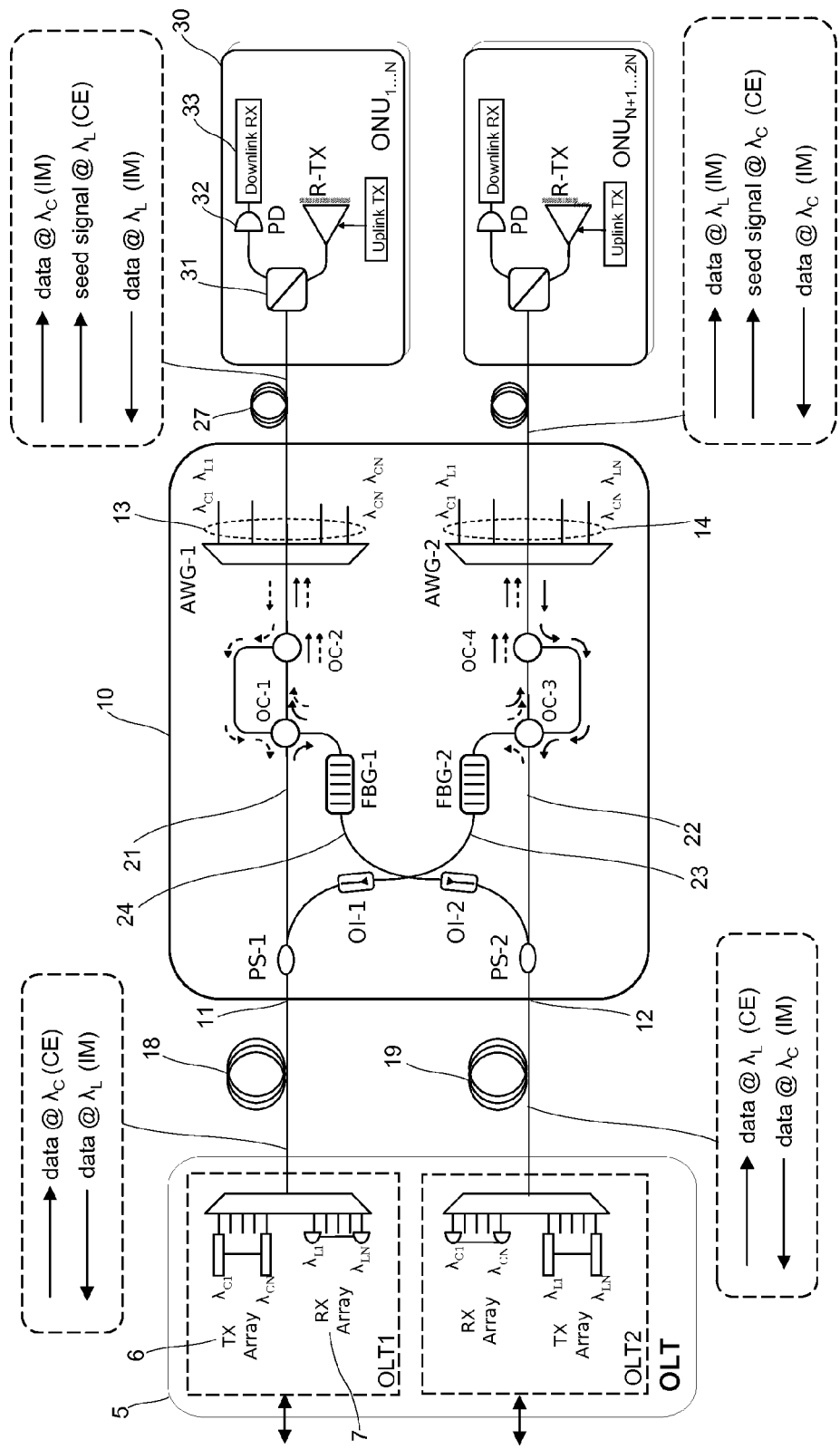
FIG. 1 shows a WDM-PON.

FIG. 1 shows a wavelength division multiplexed passive optical network (WDM-PON). The PON can be used as an access network to serve subscriber premises. The main entities in the WDM-PON are a central office 5, a plurality of Optical Network Units (ONU) deployed at subscriber premises or kerbside cabinets and a distribution node 10 (also called a remote node).

Central office 5 interfaces with a metro or core communication network. The central office 5 has two Optical Line Termination (OLT) units OLT1, OLT2. The ONUs are arranged in two groups. The first group of ONUs comprises units $ONU_{1 \ldots N}$ and the second group of ONUs comprises units $ONU_{N+1 \ldots 2N}$.

Distribution node 10 is positioned at some point between the central office 5 and ONUs. Typically, the distribution node 10 will be much closer to the ONUs than the central office 5. The distribution node 10 comprises a port 11 for connecting to a feeder fibre 18 from OLT1 and a port 12 for connecting to a feeder fibre 19 from OLT2. The distribution node 10 also comprises a set of ports 13 for connecting to the first group of ONUs ($ONU_{1 \ldots N}$) and a set of ports 14 for connecting to the second group of ONUs ($ONU_{N+1 \ldots 2N}$). Each of the ONUs is connected by a single fiber to a respective one of the sets of ports 13, 14. The distribution node 10 comprises a set of optical connection paths 21-24 between ports 11-14. A first path 21 connects port 11 to ports 13 and includes circulators OC-1, OC-2 and a splitter, such as an Array Waveguide Grating (AWG) AWG-1. Splitter AWG-1 has the effect of splitting the band of $\lambda_C$ signals, on a wavelength divided basis, onto separate fibres 27. So, the first fibre 27 carries a signal at wavelength $\lambda_{C1}$ to $ONU_1$, the second fibre 27 carries a signal at wavelength $\lambda_{C2}$ to $ONU_2$, and so on. A second path 22 connects port 12 to ports 14 and includes circulators OC-3, OC-4 and an Array Waveguide Grating AWG-2. Splitter AWG-2 has the effect of splitting the band of $\lambda_L$ signals, on a wavelength divided basis, onto separate fibres. So, the first fibre carries a signal at wavelength $\lambda_{L1}$ to $ONU_{N+1}$, the second fibre 27 carries a signal at wavelength $\lambda_{L2}$ to $ONU_{2N}$, and so on. A cross-over path 23 allows downstream signals from OLT1 to connect with ONUs served by OLT2 and includes an optical isolator OI-1 and a Fibre Bragg grating FBG-2. A cross-over path 24 allows downstream signals from OLT2 to connect with ONUs served by OLT1 and includes an optical isolator OI-2 and a Fibre Bragg grating FBG-1.

Each ONU has a colourless reflective modulator R-TX. There are various options for the type of reflective modulator, depending on the desired uplink line rate. A reflective Semiconductor Optical Amplifier (R-SOA) can be used at line rates of 1.25 Gb/s (GigaBit Ethernet) and a reflective electro-absorption modulator (REAM) can be used at line rates of 10 Gb/s.

Each ONU is served by two wavelengths. The first wavelength is used to carry downlink data and the second wavelength is used to seed the reflective transmitter for the uplink communication. The wavelength separation of the downstream channels coincides with the Free Spectral Range (FSR) of the splitters AWG-1, AWG-2. As commercially available AWG are often designed with a FSR allowing to combine channels allocated in C and L band: for the sake of simplicity in the following we will consider a scenario in which each ONU is served by a wavelength in C-band (referred as $\lambda_C$) and one in L-band (referred as $\lambda_L$). However, this choice is not mandatory, and other wavelength allocation plans can be used. Inside the ONU, a coarse C/L band WDM filter 31 is used to separate $\lambda_C$ and $\lambda_L$. This filter prevents reflections of the upstream signal to reach the ONU receiver: in this way the downstream signal is not affected by uncontrolled reflections of the downstream signal.

Figure 2A:
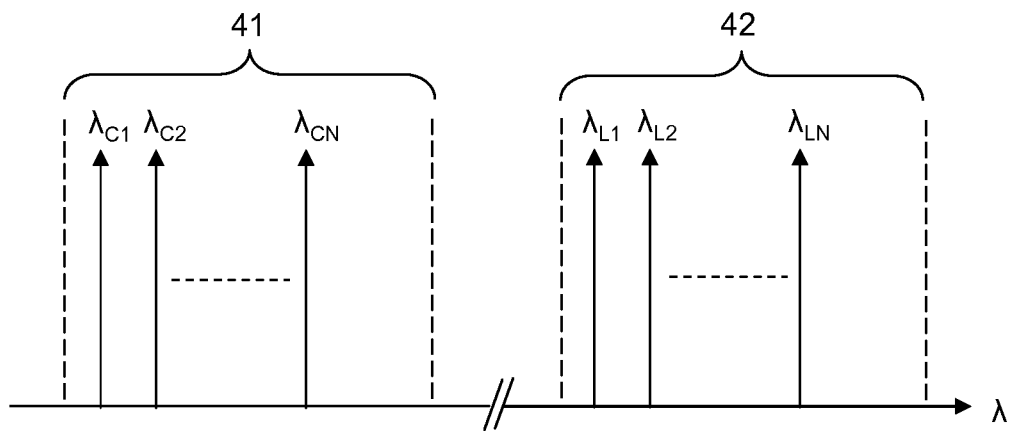
FIGS. 2A and 2B show possible wavelength allocations for the signals carried within the PON of FIG. 1.
Figure 2B:
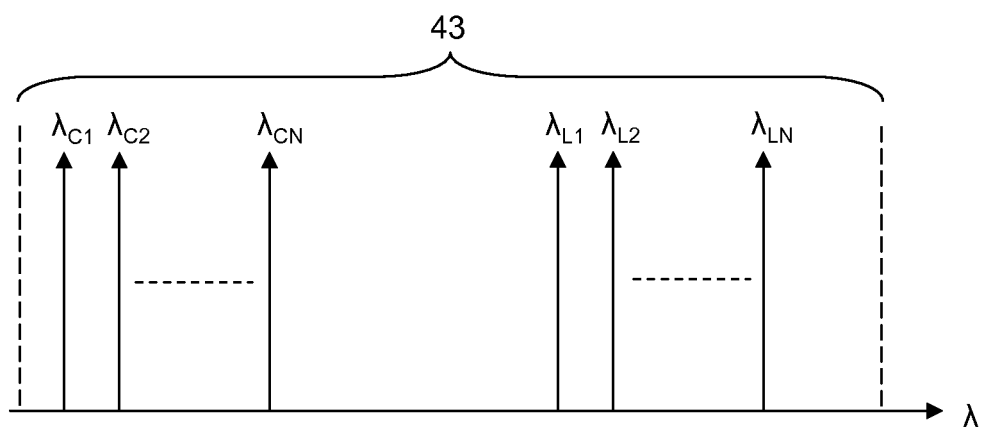

FIGS. 2A and 2B show two possible wavelength allocation plans. In FIG. 2A the wavelength allocation plan comprises a first set of N channels ($\lambda_{C1}$-$\lambda_{CN}$) in the C band 41 and a second set of N channels ($\lambda_{L1}$-$\lambda_{LN}$) in the L band 42, giving a total of 2N wavelengths serving 2N ONUs ($ONU_1$ to $ONU_{2N}$). The network is designed in such a way that each wavelength is used for downstream communications for a given ONU and also remodulated by another ONU for upstream communications. Crosstalk is avoided by using two feeder fibres 18, 19 and a system of optical circulators OC-1-OC-4 as described below. In the wavelength allocation plan of FIG. 2B the first set of N channels ($\lambda_{C1}$-$\lambda_{CN}$) and the second set of N channels occupy different portions of one particular wavelength band 43, e.g. the "red" and "blue" portions of the C-band. Any other convenient wavelength plan can be used which gives wavelength separation between each of the 2N wavelengths used in the WDM-PON.

OLT1 and OLT2 each have an array of transmitters 6 and an array of receivers 7. For sake of simplicity, the following discussion refers to a channel bit rate of 10 Gb/s. However, any other suitable bit rate can be used, with corresponding adjustment to other quantities such as filter pass-bands and so on.

The signals output by the transmitter array 6 in OLT1 will now be described. The $\lambda_C$ transmitters of OLT1 each output a quasi-constant envelope modulated signal at $\lambda_C$. The modulation can be phase or frequency modulation. For phase modulation an array of externally modulated lasers is typically needed, while frequency modulation can typically directly modulate lasers with a required frequency deviation, at least for 1.25 Gb/s or 2.5 Gb/s channels, leading to a significant cost reduction. The modulated downstream signals ($\lambda_C$) are launched into a common feeder fiber 18 towards distribution node 10. At the distribution node 10, the signal is split at optical splitter PS-1. A first fraction of the signals continue along path 21 to an optical circulator OC-1. The circulator OC-1 forwards signals from path 21 to the cross-over path 24 and the Fibre Bragg Grating (FBG-1) positioned in path 24. FBG-1 simultaneously demodulates all of the downstream signals ($\lambda_C$). FBG-1 has the effect of converting constant envelope (CE) modulation (i.e. phase or frequency modulation) into intensity modulation. FBG-1 can be a periodic reflective pass-band filter, with Gaussian-shaped pass-band windows. For 10 Gb/s signals FBG-1 can have passband windows with a 6 GHz FWHM. The reflective windows in FBG-1 should coincide with the $\lambda_C$ channels. So, if $\lambda_C$ channels are on a 100 GHz grid, the FBG-1 periodicity will be 100 GHz.

Signals reflected by FBG-1 are demodulated, i.e. converted from constant envelope (CE) modulation to Intensity Modulation (IM). The fraction of the $\lambda_C$ signals which pass through FBG-1 are blocked by an optical isolator (OI-2) placed in path 24 beyond FBG-1 itself to prevent unwanted interference. The demodulated signals reflected by the grating FBG-1 are returned to the path 21 by circulator OC-1 and forwarded by circulator OC-2 to splitter AWG-1. The signals are wavelength division demultiplexed by splitter AWG-1 and delivered to $ONU_1$-$ONU_N$ via ports 13.

The second fraction of signals split at PS-1 are sent to FBG-2. FBG-2 has the same characteristics of FBG-1, but is designed to perform demodulation of the $\lambda_L$ channels only. Therefore, the $\lambda_C$ channels pass through FBG-2 unaffected, i.e. not demodulated and still constant envelope. The signals reach $ONU_{N+1}$-$ONU_{2N}$ via a path which includes optical circulators OC3, OC-4 and grating AWG-2. These constant envelope signals are used by $ONU_{N+1}$-$ONU_{2N}$ as seed signals for the upstream signal remodulation. The remodulated $\lambda_C$ signals are routed to port 12 of node 10 through AWG-2, OC-3 and OC-4. On the return path the upstream signals are coupled to the feeder fiber 19 and reach OLT2. This avoids cross-talk issues.

The $\lambda_L$ transmitters of OLT2 output phase or frequency modulated downstream signals at $\lambda_L$ and these signals are distributed in the same manner as the $\lambda_C$ signals. Briefly, the modulated downstream signals ($\lambda_L$) are launched into a common feeder fiber 19 towards distribution node 10. At the distribution node 10, the signal is split at optical splitter PS-2. A first fraction of the signals continue along path 22 to an optical circulator OC-2. The circulator OC-2 forwards signals from path 22 to the cross-over path 23 and the Fibre Bragg Grating (FBG-2) positioned in path 23. FBG-2 simultaneously demodulates all of the downstream signals. The fraction of the $\lambda_C$ signals passing through FBG-2 is blocked by an optical isolator (OI-1) placed beyond FBG-2 itself. The demodulated signals are then delivered to $ONU_{N+1}$-$ONU_{2N}$ through an arrangement of optical circulators (OC-3, OC-4) and AWG-2. The second fraction of signals splitted at PS-2 are sent to FBG-1. The $\lambda_L$ channels pass through FBG-1 unaffected, i.e. not demodulated and still constant envelope. The signals reach $ONU_1$-$ONU_N$ via a path which includes optical circulators OC-1, OC-2 and grating AWG-1. These constant envelope signals are used by $ONU_1$-$ONU_N$ as seed signals for the upstream signal remodulation. The remodulated 4 signals are routed to the OLT again through AWG-1, OC-1 and OC-2. On the return path the upstream signals are coupled to the feeder fiber 18 and reach OLT1.

Looking at each of the fibres 18, 19 it can be seen that the signals travelling in different directions are at different wavelengths, thereby minimising any crosstalk effects.

Delivering constant envelope seeding signals to the reflective ONUs has two main advantages. Firstly, the remodulator does not need to operate in gain-saturation regime to erase the downstream signal. This relaxes constrains relative to the power budget in the PON. The second advantage resides in the possibility of implementing TDMA on each wavelength-pair. It is not trivial to implement hybrid WDM/TDMA networks with reflective ONTs and reuse of the downstream wavelength in the upstream. Using a conventional OOK modulation scheme for the downstream, the ONT cannot transmit data when the downstream signal is at the zero level. This constraint introduces significant limitations: for example, an ONU cannot start a transmission (or request a connection) arbitrarily. In contrast, using a quasi-continuous envelope modulation scheme for the downstream, such as DPSK or FSK, always presents a constant envelope for the seed signal, regardless of the transmitted symbol being a "1" or "0". This ensures that an ONU always receives a seed signal which can be used to transmit upstream at any time.

Figure 3:
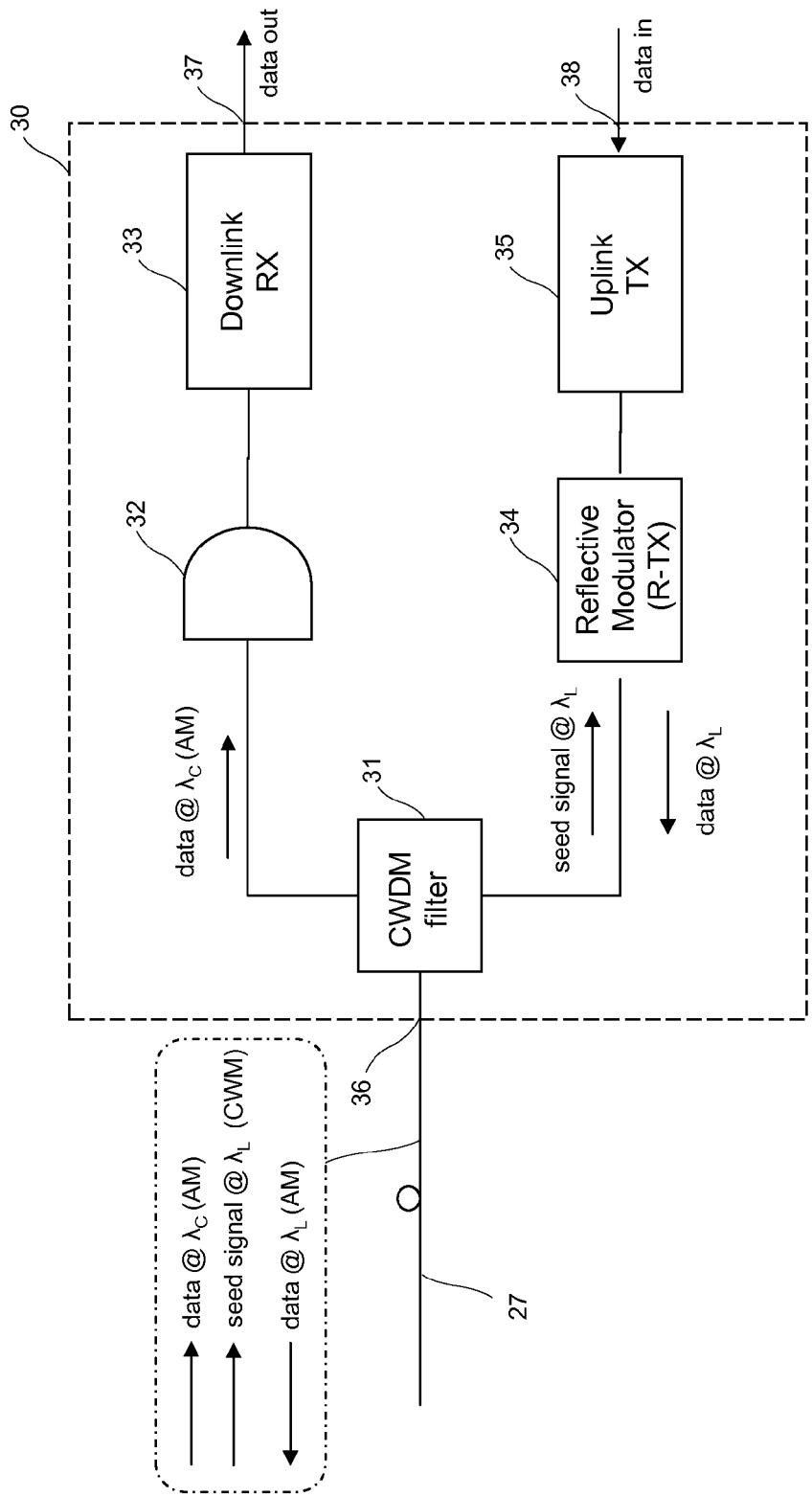
FIG. 3 shows apparatus at one of ONUs of the network of FIG. 1.

FIG. 3 shows the apparatus at one of the ONUs $ONU_1$-$ONU_N$ 30 in more detail. An optical fibre 27 which joins the ONU and the distribution node 10 connects to a port 36 of the ONU. Port 36 is connected to a wavelength filter 31. This filter separates signals in the C-band and L-band. Filter 31 passes C-band signals to a photodetector 32 for detecting the intensity modulated data. An electrical output from the photodetector 32 is applied to a receiver 33. Receiver 33 decodes the received data signal and outputs data from port 37. Filter 31 passes L-band seed signals to a reflective modulator 34. Data for upstream transmission is received at a port 38 and applied to an uplink transmitter 35 where the data is encoded for transmission. Encoded data is applied as an input to the reflective modulator 34. The reflective modulator 34 modulates the seed signal at $\lambda_L$ with the encoded data to form a modulated data signal at $\lambda_L$. The modulated signal at $\lambda_L$ is passed by filter 31 and forwarded through port 36 onto fibre 27.

All of the ONUs in the system of FIG. 1 have the same set of components shown in FIG. 2 and therefore the ONUs are considered "colourless". The only difference between the two groups of ONUs is to swap the connection between the filter 31 and receive/transmit chains of the ONU: for $ONU_1$-$ONU_N$, the filter 31 provides a C-band output to the photodetector 32 and an L-band output to the reflective modulator 34 and for $ONU_{N+1}$-$ONU_{2N}$ the filter 31 provides an L-band output to the photodetector 32 and a C-band output to the reflective modulator 34.

Figure 4:
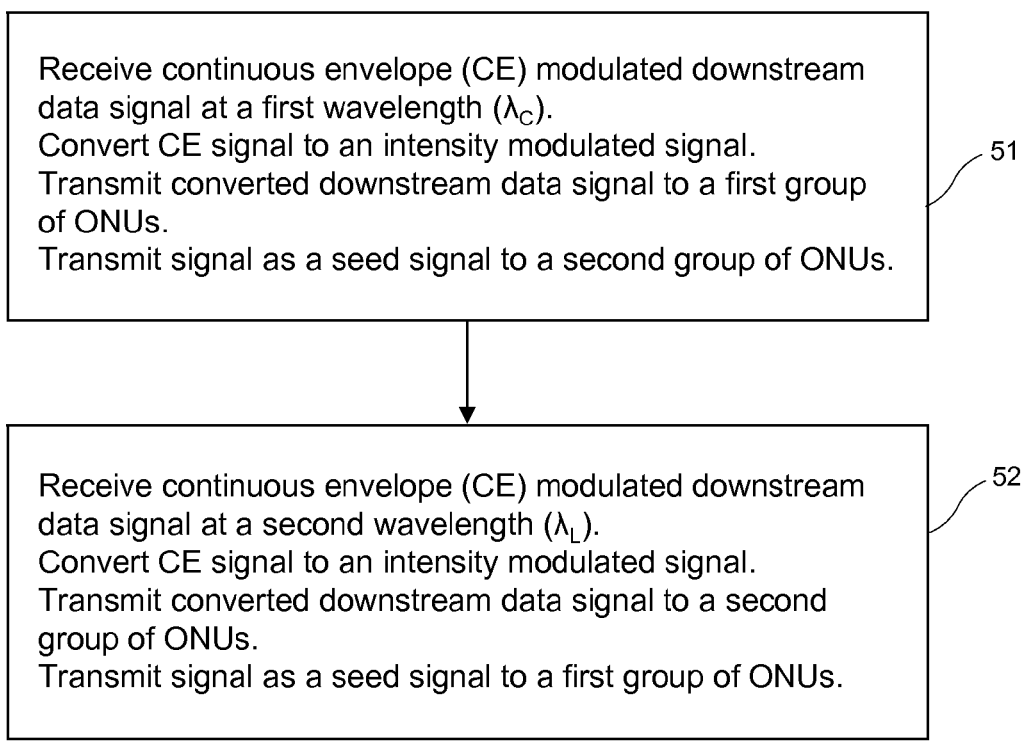
FIG. 4 shows a method performed by a distribution node of the WDM-PON.

FIG. 4 shows the steps of a method performed by the distribution node 10 of FIG. 1. At step 51 the node 10 receives a continuous envelope (CE) modulated downstream data signal at a first wavelength ($\lambda_C$). The signal is converted to an intensity modulated signal. The converted downstream data signal is transmitted to a first group of ONUs. The signal is also transmitted as a seed signal to a second group of ONUs.

At step 52 the node 10 receives a continuous envelope modulated downstream data signal at a second wavelength ($\lambda_L$). The signal is converted to an intensity modulated signal. The converted downstream data signal is transmitted to a second group of ONUs. The signal is also transmitted as a seed signal to a first group of ONUs. Steps 51 and 52 can be performed in sequence (in any order) or, most advantageously, are performed simultaneously. The distribution node 10 can simultaneously convert a plurality of signals, as previously described.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A distribution node for a passive optical network comprising:
    a first port for receiving a first optical continuous envelope modulated downstream data signal at a first wavelength from a first optical line termination (OLT) unit;
    a second port for receiving a second optical continuous envelope modulated downstream data signal at a second wavelength from a second OLT unit;
    a third port for connecting to a first group of optical network units (ONUs);
    a fourth port for connecting to a second group of ONUs;
    a first converter which is arranged to perform continuous envelope modulation-to-intensity modulation conversion of the first optical downstream data signal and to forward the converted first optical downstream data signal to the first group of ONUs; and
    a second converter which is arranged to perform continuous envelope modulation-to-intensity modulation conversion of the second optical downstream data signal and to forward the converted second optical downstream data signal to the second group of ONUs;
    wherein the distribution node is further arranged to forward a seed signal at the first wavelength to the second group of ONUs and forward a seed signal at the second wavelength to the first group of ONUs, each seed signal being for use in forming an upstream modulated signal at an ONU.

2. A distribution node according to claim 1 wherein the distribution node is arranged to forward an optical upstream data signal at the second wavelength from the first group of ONUs to the first OLT unit and to forward an optical upstream data signal at the first wavelength from the second group of ONUs to the second OLT unit.

3. A distribution node according to claim 1 comprising:
    a first path connecting the first port to the third port;
    a second path connecting the second port to the fourth port;
    a first cross-connection between the first path and the second path for coupling a portion of the first optical downstream data signal to the second path, the first cross-connection comprising the second converter;
    a second cross-connection between the second path and the first path for coupling a portion of the second optical downstream data signal to the first path, the second cross-connection comprising the first converter.

4. A distribution node according to claim 3 wherein the first converter and the second converter are reflective devices.

5. A distribution node according to claim 4 wherein the converters are Fibre Bragg Gratings.

6. A distribution node according to claim 4 wherein the first path comprises a first circulator which is connected to the second cross-connection path and arranged to:
    forward the portion of the second optical downstream data signal from the second cross-connection in the downstream direction;
    forward a portion of the first optical continuous envelope modulated downstream data signal to the first converter along the second cross-connection, receive the converted first optical downstream data signal along the second cross-connection and forward the converted first optical downstream data signal in the downstream direction.

7. A distribution node according to claim 4 wherein the second path comprises a first circulator which is connected to the first cross-connection path and arranged to:
    forward the portion of the first optical downstream data signal from the first cross-connection in the downstream direction;
    forward a portion of the second optical continuous envelope modulated downstream data signal to the second converter along the first cross-connection, receive the converted second optical downstream data signal along the first cross-connection and forward the converted second optical downstream data signal in the downstream direction.

8. A distribution node according to claim 3 further comprising an isolator in the first cross-connection and an isolator in the second cross-connection.

9. A distribution node according to claim 1 wherein the first port is arranged to receive a plurality of first continuous envelope modulated optical downstream data signals each at a respective first wavelength from the first OLT unit and the second port is arranged to receive a plurality of second continuous envelope modulated optical downstream data signals each at a respective second wavelength from the second OLT unit and wherein the first converter is arranged to perform continuous envelope modulation-to-intensity modulation conversion of the plurality of first optical downstream data signals and the second converter is arranged to perform continuous envelope modulation-to-intensity modulation conversion of the plurality of second optical downstream data signals.

10. A passive optical network comprising:
    a distribution node comprising:
        a first port for receiving a first optical continuous envelope modulated downstream data signal at a first wavelength from a first optical line termination (OLT) unit,
        a second port for receiving a second optical continuous envelope modulated downstream data signal at a second wavelength from a second OLT unit;
        a third port for connecting to a first group of optical network units (ONUs);
        a fourth port for connecting to a second group of ONUs,
        a first converter which is arranged to perform continuous envelope modulation-to-intensity modulation conversion of the first optical downstream data signal and to forward the converted first optical downstream data signal to the first group of ONUs, and
        a second converter which is arranged to perform continuous envelope modulation-to-intensity modulation conversion of the second optical downstream data signal and to forward the converted second optical downstream data signal to the second group of ONUS, wherein the distribution node is further arranged to forward a seed signal at the first wavelength to the second group of ONUs and forward a seed signal at the second wavelength to the first group of ONUs, each seed signal being for use in forming an upstream modulated signal at an ONU;
a first group of optical network units;
a second group of optical network units and wherein each of the optical network units is arranged to receive a respective seed signal and further comprises a modulator which is arranged to modulate the seed signal with upstream data.

11. The passive optical network according to claim 10 wherein the distribution node is arranged to forward an optical upstream data signal at the second wavelength from the first group of ONUs to the first OLT unit and to forward an optical upstream data signal at the first wavelength from the second group of ONUs to the second OLT unit.

12. The passive optical network according to claim 10 wherein the distribution node further comprises:
a first path connecting the first port to the third port;
a second path connecting the second port to the fourth port;
a first cross-connection between the first path and the second path for coupling a portion of the first optical downstream data signal to the second path, the first cross-connection comprising the second converter;
a second cross-connection between the second path and the first path for coupling a portion of the second optical downstream data signal to the first path, the second cross-connection comprising the first converter.

13. The passive optical network according to claim 12 wherein the first converter and the second converter of the distribution node are reflective devices.

14. The passive optical network according to claim 13 wherein the first converter and the second converter of the distribution node are Fibre Bragg Gratings.

15. The passive optical network according to claim 13 wherein the first path comprises a first circulator which is connected to the second cross-connection path and arranged to:
forward the portion of the second optical downstream data signal from the second cross connection in the downstream direction;
forward a portion of the first optical continuous envelope modulated downstream data signal to the first converter along the second cross-connection, receive the converted first optical downstream data signal along the second cross-connection and forward the converted first optical downstream data signal in the downstream direction.

16. The passive optical network according to claim 13 wherein the second path comprises a first circulator which is connected to the first cross-connection path and arranged to:
forward the portion of the first optical downstream data signal from the first cross-connection in the downstream direction; and
forward a portion of the second optical continuous envelope modulated downstream data signal to the second converter along the first cross-connection, receive the converted second optical downstream data signal along the first cross-connection and forward the converted second optical downstream data signal in the downstream direction.

17. A method of processing signals at a distribution node of a passive optical network comprising:

receiving, at a first port, a first optical continuous envelope modulated downstream data signal at a first wavelength from a first optical line termination (OLT) unit;
receiving, at a second port, a second optical continuous envelope modulated downstream data signal at a second wavelength from a second OLT unit;
performing continuous envelope modulation-to-intensity modulation conversion of the first optical downstream data signal and forwarding the converted first optical downstream data signal to a third port connected to a first group of optical network units (ONUs);
performing continuous envelope modulation-to-intensity modulation conversion of the second optical downstream data signal and forwarding the converted second optical downstream data signal to a fourth port connected to a second group of ONUs;
forwarding a seed signal at the first wavelength to the second group of ONUs and forwarding a seed signal at the second wavelength to the first group of ONUs, each seed signal being for use in forming an upstream modulated signal at an ONU.

18. A method according to claim 17 further comprising:
forwarding an optical upstream data signal at the second wavelength from the first group of ONUs to the first OLT unit; and
forwarding an optical upstream data signal at the first wavelength from the second group of ONUs to the second OLT unit.

19. A method according to claim 17 further comprising:
coupling a portion of the first optical downstream data signal along a first cross-connection to a second path between the second port and fourth port;
coupling a portion of the second optical downstream data signal along a second cross-connection to a first path between the first port to the third port;
forwarding a portion of the first optical continuous envelope modulated downstream data signal to the second cross-connection, performing the continuous envelope modulation-to-intensity modulation conversion at a reflective converter in the second cross-connection and forwarding the converted first optical downstream data signal in the downstream direction;
forwarding a portion of the second optical continuous envelope modulated downstream data signal to the first cross-connection, performing the continuous envelope modulation-to-intensity modulation conversion at a reflective converter in the first cross-connection and forwarding the converted first optical downstream data signal in the downstream direction.

20. A method according to claim 17 wherein there is a plurality of first continuous envelope modulated optical downstream data signals each at a respective first wavelength and a plurality of second continuous envelope modulated optical downstream data signals, each at a respective second wavelength and wherein the step of performing continuous envelope modulation-to-intensity modulation conversion of the first optical downstream data signal is performed for the plurality of first optical downstream data signals and the step of performing continuous envelope modulation-to-intensity modulation conversion of the second optical downstream data signal is performed for the plurality of second optical downstream data signals.

* * * * *